Figure 25:
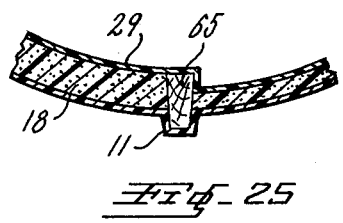

March 5, 1963 W. H. SCHMALZ 3,080,267
BOAT HULL STRUCTURE AND METHOD OF PRODUCING SAME
Filed March 23, 1961 4 Sheets-Sheet 1
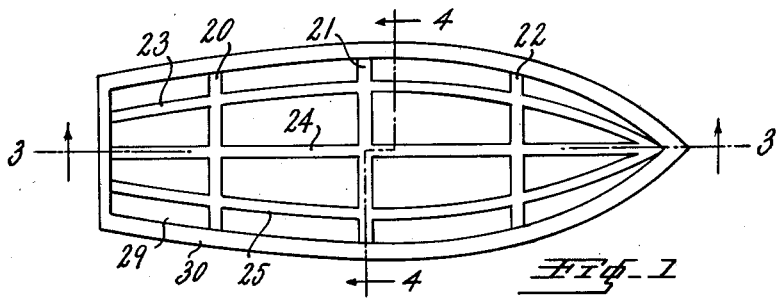
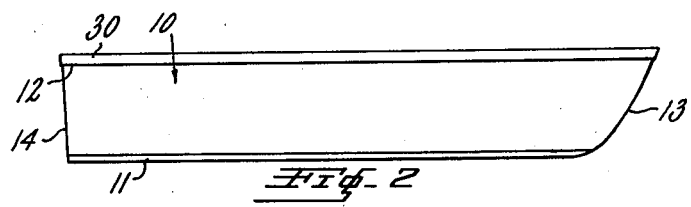
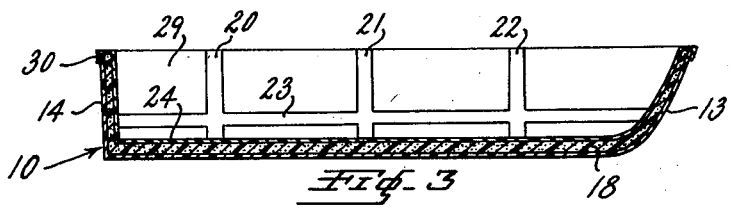
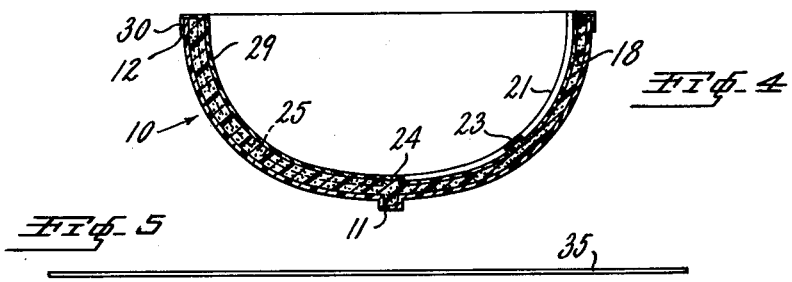
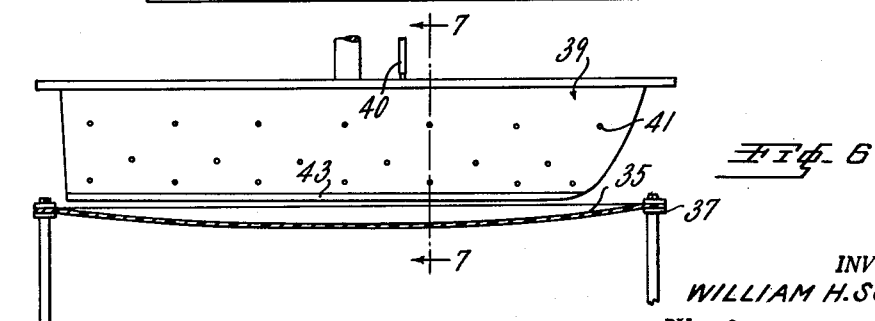
INVENTOR.
WILLIAM H. SCHMALZ
BY James J. Long
AGENT March 5, 1963 W. H. SCHMALZ 3,080,267
BOAT HULL STRUCTURE AND METHOD OF PRODUCING SAME
Filed March 23, 1961 4 Sheets-Sheet 2
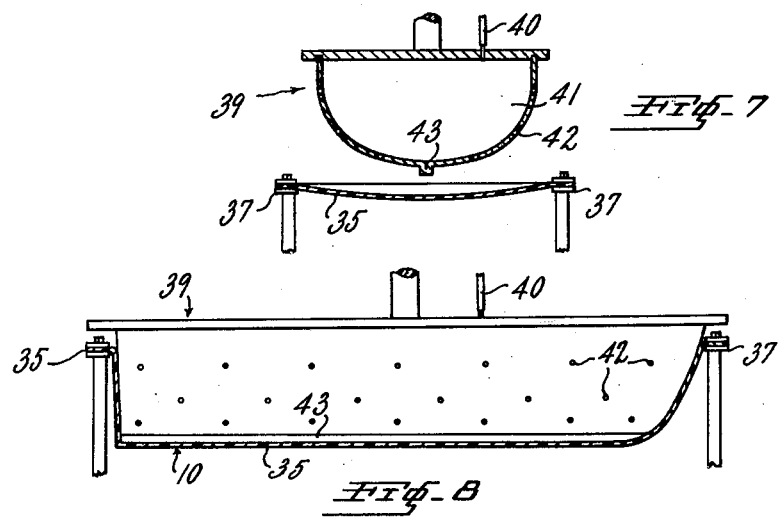
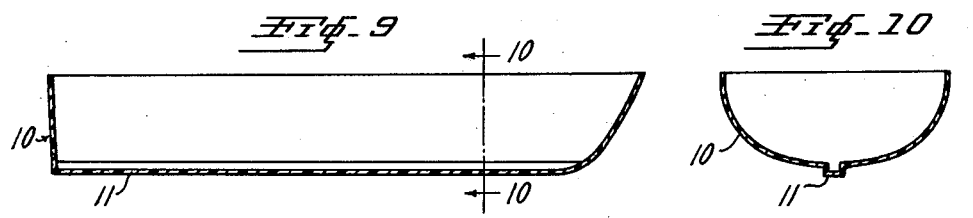
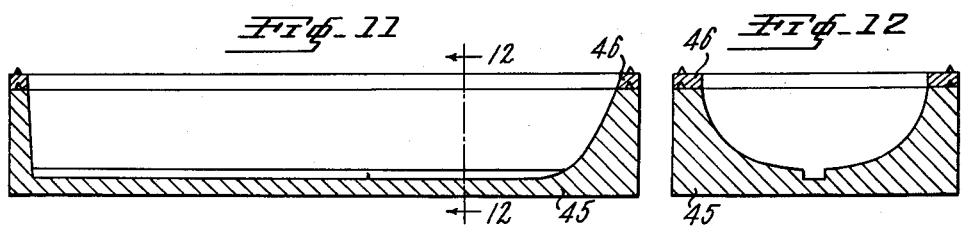
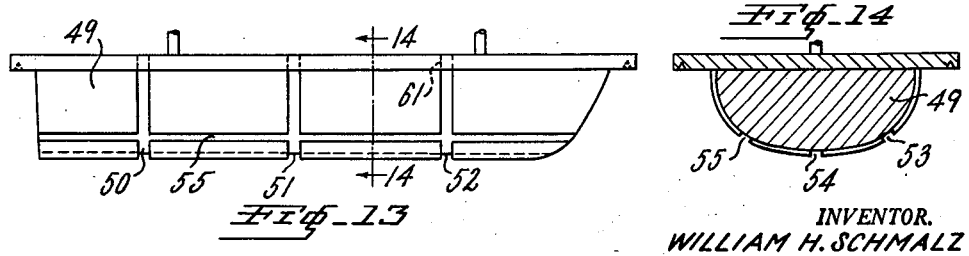
INVENTOR.
WILLIAM H. SCHMALZ
BY James J. Long
AGENT March 5, 1963  W. H. SCHMALZ  3,080,267
BOAT HULL STRUCTURE AND METHOD OF PRODUCING SAME
Filed March 23, 1961  4 Sheets-Sheet 3
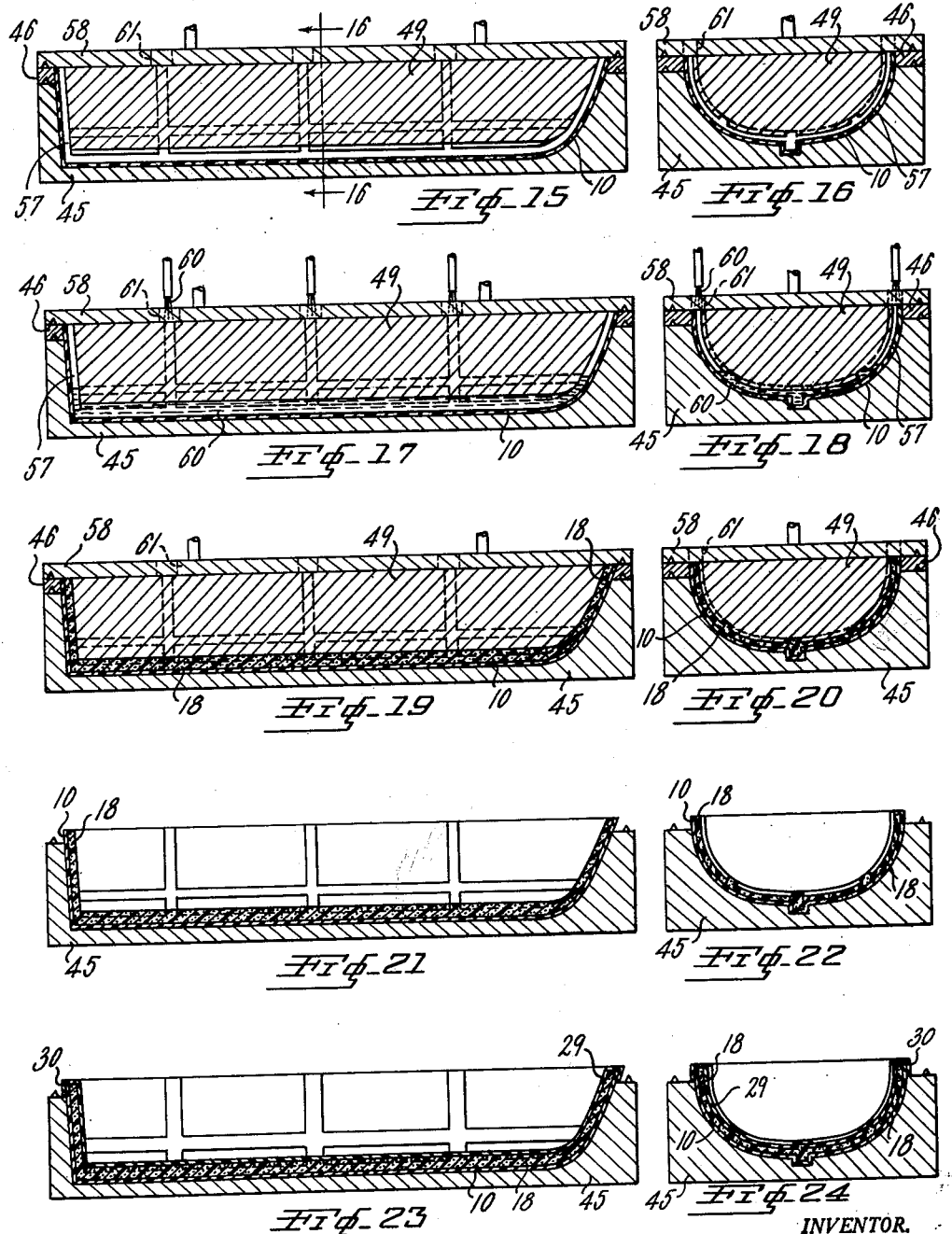
INVENTOR.
WILLIAM H. SCHMALZ
BY James J. Long
AGENT March 5, 1963 W. H. SCHMALZ 3,080,267
BOAT HULL STRUCTURE AND METHOD OF PRODUCING SAME
Filed March 23, 1961 4 Sheets-Sheet 4

INVENTOR.
WILLIAM H. SCHMALZ
BY James J. Long
AGENT

United States Patent Office 3,080,267
Patented Mar. 5, 1963

3,080,267
BOAT HULL STRUCTURE AND METHOD
OF PRODUCING SAME
William H. Schmalz, Kitchener, Ontario, Canada, assignor to United States Rubber Company, New York, N.Y., a corporation of New Jersey
Filed Mar. 23, 1961, Ser. No. 97,867
3 Claims. (Cl. 154—43)

This invention relates to a boat structure and to a method of making the same, and more particularly it relates to the construction of a composite boat hull having an outer member made of a formed sheet of thermoplastic material, a core of flotation material, and an interior surface made of thermosetting plastic.

It has previously been known to make boat hulls from thermosetting resins, notably glass-reinforced polyester resin compositions, but such boat hulls have not had the desirable qualities of being buoyant when filled or partially filled with water. Although methods of incorporating flotation material in such boat hulls have been proposed, such methods have not been entirely satisfactory. Furthermore, such plastic hulls have not had as great a resistance to external impacts as would be desirable in a boat hull.

The present invention contemplates a composite boat hull, comprising an exterior member, which forms the bottom and sides of the hull, made of a high-impact thermoplastic sheet, to which the desired shape is imparted by vacuum forming or similar drawing operation. Cast integrally with this exterior thermoplastic sheet, over substantially the entire inner surface thereof, there is a relatively thicker (e.g., 2 to 20 times thicker) layer of foamed in place rigid cured plastic which serves as a structural part of the hull, as well as a flotation medium. There is then laid up, over the entire inner surface of the cured, foamed in place plastic layer, a thermosetting resinous composition, applied in a liquid state in any suitable manner such as hand lay-up or spraying, and preferably composed of polyester resin or epoxy resin, reinforced with glass fibers.

Figure 26:
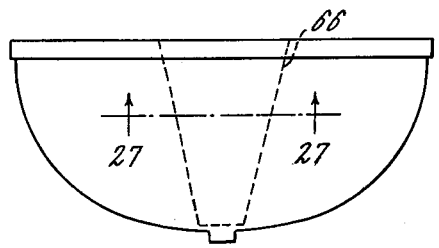
Figure 27:
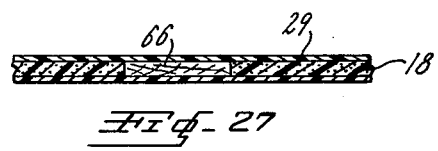
Figure 28:
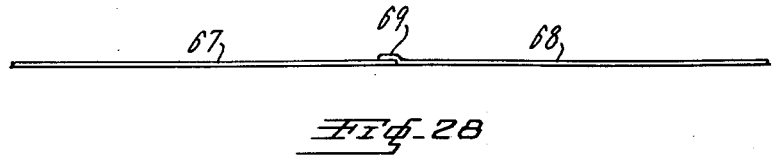

Various objects and advantages of the invention will be made manifest in the following detailed description, which is intended to be read with reference to the accompanying drawings, wherein:

FIG. 1 is a plan view of a boat hull of the invention;
FIG. 2 is a longitudinal elevational view of the boat hull of FIG. 1;
FIG. 3 is a longitudinal sectional elevation, taken along the line 3—3 of FIG. 1;
FIG. 4 is a transverse sectional view, taken along the lines 4—4 of FIG. 1, on a larger scale;
FIG. 5 is an end view of a sheet of thermoplastic material suitable for forming the outer shell of the boat hull;
FIG. 6 is a longitudinal view, partly in section, showing the plastic sheet of FIG. 5 clamped in a supporting and shaping device;
FIG. 7 is a transverse sectional view, taken along line 7—7 of FIG. 6;
FIG. 8 is a view similar to FIG. 6, showing the plastic sheet in a shaped position in the shaping device;
FIG. 9 is a longitudinal sectional view of the plastic sheet in the form of a boat hull after removal from the shaping device of FIGS. 6–8;
FIG. 10 is a transverse sectional view of the shaped plastic shell, taken at the line 10—10 of FIG. 9;
FIG. 11 is a longitudinal sectional view of a female mold assembly for the boat hull;
FIG. 12 is a transverse sectional view of the female mold assembly, taken along line 12—12 of FIG. 11;
FIG. 13 is a longitudinal view of a male mold portion adapted to cooperate with the assembly of FIGS. 11–12;
FIG. 14 is a transverse sectional view of the male mold, taken along line 14—14 of FIG. 13;
FIG. 15 is a longitudinal sectional view showing the female and male molds of FIGS. 11–14 brought together with the shaped plastic shell of FIGS. 9–10 contained therein;
FIG. 16 is a transverse section taken along the line 16—16 of FIG. 15;
FIGS. 17, 18 are views similar to FIGS. 15, 16, respectively, showing the pouring of a foamable liquid plastic into the spaces of the assembly;
FIGS. 19, 20 are similar to FIGS. 17, 18, respectively, showing the foam plastic in place;
FIGS. 21, 22 are similar to FIGS. 19, 20 but show parts of the mold assembly removed to expose the molded boat hull;
FIGS. 23, 24 are similar to FIGS. 21, 22 and show a plastic covering layer applied to the molded boat hull;
FIG. 25 is a fragmentary enlarged transverse sectional view showing a modified construction of the keel portion of the boat hull;
FIG. 26 is an end view of the stern of the boat hull in a modified construction;
FIG. 27 is a fragmentary sectional plan view, taken along the line 27—27 of FIG. 26; and
FIG. 28 is an end view of a modified plastic sheet suitable for forming the outer shell of the boat.

The invention typically involves first providing a sheet of a thermoplastic material to form the outer skin or shell of the boat. Such outer shell may be a single piece, or it may be constituted of several separate sheets. joined together at any suitable stage of the construction by any desired method such as heat welding, cementing, or solvent welding. The thermoplastic sheet is of the kind known as high impact plastic, that is characterized by the ability to take relatively severe blows without cracking or denting (having an impact strength in excess of 1 foot-pound, and preferably in excess of 2 foot-pounds, usually 3 or more foot pounds). For this purpose the invention employs what is known as a gum plastic material, or, more specifically a mixture of a hard, inelastic, resinous plastic material with a relatively elastic, soft, elastomeric or rubbery material. For the present purposes the resin is employed in major proportion while the rubber is employed in minor proportion. In the preferred practice of the invention the resinous portion of the gum plastic mixture from which the outer shell is made is a styrene-acrylonitrile resin (usually one containing from 50 to 95% by weight styrene and correspondingly from 50 to 5% acrylonitrile) while the rubbery portion of such gum plastic mixture is a butadiene-acrylonitrile copolymer rubber (usually containing from 50 to 90% by weight of butadiene and correspondingly from 50 to 10% of acrylonitrile). The resinous portion frequently amounts to from 51 to 90% by weight, while the rubbery portion correspondingly amounts to from 49 to 10%, of the mixture of resin and rubber. In place of styrene-acrylonitrile resin, a mixture of styrene-acrylonitrile resin and vinyl chloride type resin may be used (in weight ratio of, for example from 1:1 to 10:1, preferably about 3:1). If desired, the gum plastic may be of the kind known as a graft copolymer, typically obtained by graft copolymerizing the resin-forming monomers (e.g. styrene and acrylonitrile) on a previously prepared latex of the rubber (e.g. polybutadiene or the like). Additional resin and/or rubber may be added to such graft copolymer composition to give the desired overall ratio of rubber and resin. Conventional compounding ingredients such as plasticizers, softeners, pigment, fillers, anti-oxidants, stabilizers, and the like may be included. Although the composition usually further includes vulcanizing ingredients, such as sulfur, zinc oxide and accelerator, the final sheet material as employed in the invention is still a thermoplastic substance, that is, it is capable of being shaped into a desired form by the application of heat and pressure.

The thermoplastic gum plastic material which forms the outer shell of the boat may be formed into a flat sheet by any suitable method such as calendering, and such sheet is subsequently drawn or formed into the shape of the boat hull, preferably by the vacuum forming method involving shaping the sheet with the aid of a plug or male mold.

After the high impact thermoplastic sheet or gum plastic sheet of the kind described is formed into a shell (usually having a thickness of, e.g., 0.02 to 0.25 inch) representing the outer portion of the boat hull, provision is made for defining a cavity or molding space over the entire interior surface of the plastic shell. Such molding space or cavity is most conveniently defined between the inner surface of the plastic shell and the surface of a male mold member carefully positioned within the shell in such manner that the respective surfaces of the shell and the mold member are spaced from each other by a predetermined desired distance. This distance, or thickness of the mold cavity, represents the thickness of a foamed-in-place plastic portion of the boat hull, formed in a manner to be described. The thickness of the mold cavity, and consequently the thickness of the plastic foam, may vary as desired from place to place in the boat hull. Thus, we typically provide localized thickened areas of foam at places where greater strength and rigidity are desired, notably the keel, stem and transom, as well as longitudinal stringers and transverse ribs. This is conveniently accomplished in accordance with the invention by providing recessed areas in the surface of the male mold plug, which recessed areas represent thickened portions of the foamed plastic layer. If desired, wood reinforcement or other reinforcing members such as aluminum or steel tubing may be disposed in the cavity, before the foam is poured, to add rigidity to the hull.

The foamed in place plastic is typically a polyurethane foam composition. As is well understood by those skilled in the art, rigid polyurethane foam plastic may be made from commercially available liquid compositions containing a polymer having terminal hydroxyl groups (usually a polyether or polyester), a diisocyanate, and water. The water serves to generate carbon dioxide gas in the liquid mass, causing it to foam up to a greatly increased volume, and at the same time the water causes the resulting polyurethane to become cured or cross-linked to a solid state.

In the boat construction of the invention the polyurethane foam thus formed constitutes a core member of the boat hull, and serves to give the hull thickness and buoyancy, and also contributes to rigidity by tying together the relatively thin outer thermoplastic shell (to which the polyurethane foam becomes rigidly and integrally attached during the foaming and cross-linking operation) and the relatively thin inner thermosetting plastic layer which will now be described.

The inner thermosetting plastic layer of the present boat hull is a cross-linked, insoluble, infusible, non-thermoplastic polymer, typically a polyester resin composition (or equivalent composition such as an epoxy resin), reinforced with fibrous material, preferably glass fibers, which may be in the form of chopped fibers, or batts or roving or the like, or woven fabric. This layer (which is usually of the same order of thickness as the outer thermoplastic shell) forms a hard, inert, and chemically resistant inner shell that is strong and tough. To apply this layer, the male mold plug is removed and the thermosetting resin composition is applied by hand or by spraying, as desired, to the entire exposed surface of the polyurethane foam. During cure of the thermosetting resin (which takes place at room temperature or at moderately elevated temperature, as desired) a firm, integral bond is formed between the surface of the polyurethane foam and the thermosetting plastic. This integral bond is believed to be not only a mechanical interlocking of the liquid plastic composition with the pores on the surface of the polyurethane foam, but is also thought to be possibly a chemical adhesive bonding. In any event, it is surprising that such a good bond is obtained by the procedure described, in view of the fact that polyurethane foam cast on a previously cured polyester surface does not cure or adhere properly at the surface.

The described construction can be used to make the boat hull and/or other parts of the boat such as decks, bulkheads, seats and the like, and the present construction may be combined if desired with other forms of construction, such as wood, plastic, or aluminum decks, seats, bulkheads, and the like.

An example of a suitable formulation for the thermoplastic skin is as follows:

| | Parts by weight |
|---|---|
| Styrene-acrylonitrile resin (30% acrylonitrile) | 65 |
| Butadiene-acrylonitrile rubber (18% acrylonitrile) | 25 |
| Polyvinyl chloride resin | 10 |
| Dioctyl phthalate | 4 |
| Stearic acid | 0.8 |
| Zinc oxide | 2.5 |
| Benzothiazyl disulfide | 0.4 |
| Sulfur | 1.15 |
| Calcium stearate | 0.15 |
| Cadmium stearate | 0.5 |
| Carbon black | 1.7 |

Such gum plastic systems are described in more detail in U.S. Patent 2,935,763, Newman et al., May 10, 1960.

An example of a suitable formulation for the polyurethane foam is as follows:

| | Parts by weight |
|---|---|
| Polyester of phthalic anhydride (1 mole), adipic acid (5 moles) and trimethylol propane (9.2 moles), hydroxyl value 473, acid value 1 | 70 |
| Surfactant or emulsifying agent (e.g. polyethylene sorbitan monopalmitate, "Tween-40") | 1 |
| Dimethyl ethanolamine | 0.25 |
| Water | 3 |
| Toluene diisocyanate | 60 |

Conventional formulations for rigid polyurethane foam based on polyethers (e.g. propylene oxide: triphenol adduct "Niax Triol LK-380") and other cross-linking agents (e.g. N,N,N',N'-tetrakis-(2-hydroxypropyl) ethylene diamine), and using trichloromonofluoroethane as a blowing agent in place of water may also be used. Other suitable polyurethane foam systems are described in U.S. Patent 2,910,730, Rich, Nov. 3, 1959, and the references cited therein.

An example of a suitable formulation for the polyester resin is as follows:

| | Parts by weight |
|---|---|
| Alkyd or polyester of phthalic anhydride (1 mole), maleic anhydride (1 mole) and propylene glycol (2.2 moles) | 67 |
| Styrene | 33 |
| Methyl ethyl ketone peroxide (60% in dimethyl phthalate, "Lupersol DDM") | 1 |
| Cobalt naphthenate ("Cobalt Nuodox") | 1 |

Unsaturated polyester resin systems are described in more detail in U.S. Patent 2,891,885, Brooks, June 23, 1960.

The foregoing formulations are set forth by way of non-limiting illustrative example only, and those skilled in the art will appreciate that there are numerous equivalent commercially available ingredients which may be substituted for the ones shown.

Referring to the drawings, and in particular to FIGS. 1–4, the particular embodiment of the invention shown therein is a boat hull having an outer layer or shell 10 made of high impact strength thermoplastic gum plastic material of the kind described, such shell extending as an essentially integral single piece over the entire exterior surface of the hull, including the exterior bottom and sides, from an enlarged projecting lengthwise keel 11 to the upper edge or gunwale 12 and extending from the stem or bow 13 to and across the stern or transom 14.

Within the exterior shell 10 is a firmly adherent layer 18 of foamed-in-place polyurethane plastic foam, which is relatively thick in comparison to the outer plastic layer 10 and which serves to give bulk and rigidity to the hull structure. The foamed plastic likewise extends entirely through the hull structure, from keel to gunwale and from stem to stern, in the form of essentially a single, continuous, and integral structural member. At the keel 11, the foamed plastic projects outwardly in the form of a thickened portion which fills the enlarged keel space. On the interior of the hull the foamed plastic has transverse and longitudinal thickened or enlarged portions 20, 21, 22 and 23, 24, 25 which represent, respectively, transverse ribs or frames (20, 21, 22) and longitudinal stringers (23, 24, 25) which serve further to stiffen and reinforce the entire structure. These ribs and stringers project inwardly of the hull, and the central stringer or longitudinal 24 serves as a kind of inner keel or keels on which is disposed opposite to the externally projecting keel 11 on the outside of the hull, thus providing an especially thick and strong cross-section at this point.

The entire hull is provided with an interior shell 29 or covering layer of thermosetting resin reinforced with glass fibers, which is relatively thin in comparison to the plastic foam, and which protects and encloses the plastic foam. Because of the method of manufacture, the thermosetting plastic is firmly and integrally adhered to the plastic foam, thus making an exceptionally strong and rigid structure. At the upper edge or gunwale a portion 30 of the fiber-reinforced thermosetting resin layer extends across the top of the plastic foam and overlaps downwardly over the upper marginal portion 40 of the outer thermoplastic shell. The materials rigidly bond to each other at this point, forming a leak-proof and stress-resistant seal.

Turning now to the method of making the boat hull shown in the drawings, and referring first to FIG. 5, there is shown a flat sheet 35, which may be made by calendering or any equivalent method, of the thermoplastic gum plastic composition. Although the material from which this sheet is made was compounded with curatives, and although a certain amount of cure is believed to take place in the processing (such as milling or calendering) at elevated temperature to which the sheet material is subjected during preparation, the material is nevertheless essentially thermoplastic and it can be drawn or otherwise shaped at elevated temperatures.

Referring to FIG. 6, the thermoplastic sheet 35 is for this purpose clamped or otherwise supported around its outer periphery on a ring-like supporting assembly 37. The sheet 35 is somewhat larger than the projected plan area of the desired boat hull, and the clamping device has essentially the contour of the edge or gunwale of the boat.

A male vacuum forming mold or plug 39 having an external size and shape corresponding to the desired plastic shell 10, is movably supported above the clamping device in such manner that the plug may be moved downwardly into the clamping ring when desired. A vacuum connection 40 on the plug serves to connect an external vacuum pump (not shown) to the hollow interior 41 (FIG. 7) of the plug, which is in communication with a plurality of holes 42 on the surface of the plug, so that when the plug is lowered into engagement with the heated plastic sheet, as shown in FIG. 8, the sheet is drawn by the vacuum into the desired shape in contact with the surface of the mold plug, thus forming a plastic shell 10 of the desired shape. The sheet while thus supported is heated before the vacuum drawing operation to a soft, pliable condition, in which it starts to sag of its own weight, by suitable heating means (not shown) such as radiant heating lamps. A medial longitudinal projection 43 on the underside of the plug serves to shape the keel portion 11 of the plastic shell 10.

The appearance of the plastic shell after removal from the vacuum drawing device is shown in FIGS. 9 and 10.

Referring to FIGS. 11 and 12, there is there shown a female mold 45 having a cavity corresponding in size and shape to the plastic shell 10. An upper portion 46 of the female mold is made in the form of a removable ring for a purpose which will become apparent hereinbelow. A male mold 49 (FIGS. 13 and 14) is also provided, having a surface contour corresponding to the interior surface of the foamed plastic member 18 of the hull. Such mold includes on its surface transverse recesses 50, 51, 52, and longitudinal recesses 53, 54, 55 corresponding to the thickened ribs 20, 21, 22 and stringers 23, 24, 25 of the plastic foam member. To carry out the plastic foaming operation, the plastic shell 10 is first deposited in the female mold 45, and then the male mold 49 is inserted in assembled position as shown in FIGS. 15, 16. In this position there is thus formed a cavity 57 which is covered or closed around the upper peripheral edge by a laterally extending flange member 58 of the male mold 49, and which serves to contain the plastic foam.

Polyurethane foamable liquid 60 is poured into the cavity 57 at a plurality of points through holes 61 passing through the flange 58 at suitable intervals. The foamable liquid is initially of small volume compared to the volume of the cavity 57 but its chemical nature is such that virtually as soon as it is mixed it begins to bubble and foam up or expand, thus filling the entire cavity with polyurethane plastic foam 18 as shown in FIGS. 19, 20. Although the foaming and curing or cross-linking of the polyurethane composition take place at room temperature it is frequently found advantageous to heat the assembly in an oven or the like (not shown) at an elevated temperature, e.g., 150–250° F., for ¼ to 3 hours, to develop the best physical properties in the foam.

Upon removal of the male mold 49 and the ring member 46 of the female mold 45 the assembly has the appearance shown in FIGS. 21, 22. The thermosetting composition 29 containing glass fiber reinforcement may then be applied to the entire exposed surface, as shown in FIGS. 23, 24, including the upper marginal exterior 30. It will be understood that the polyester resin as originally applied is a liquid substance, but that it gradually changes, even at room temperature, under the influence of the catalyst contained in the resin, into a solid, thermoset material. This process may be hastened, and the physical properties may be improved, by heating the assembly (e.g. at a temperature of 100° F.–300° F. for a period of ½ to 5 hours) to advance the cure of the resin. When removed from the mold 45, the completed assembly has the appearance shown in FIGS. 1–4.

In accordance with a modification of the invention, shown in FIG. 25, a longitudinal wood reinforcing member 65 may be embedded in the keel, prior to forming the plastic in place, and in accordance with another modification, shown in FIGS. 26, 27, a reinforcing board 66 may similarly be embedded in the transom.

In accordance with a further modification, shown in FIG. 28, two plastic sheets 67, 68 may be welded together at a seam 69 to make a piece sufficiently large to form the plastic shell for the hull, as previously described.

It will be apparent from the foregoing that the invention provides many advantages. A particularly advantageous feature of the invention resides in the manner in which two relatively thin layers, namely, an outer shockresistant thermoplastic layer or shell and an inside tough thermosetting plastic layer, are spaced from each other, and yet integrally united, by the polyurethane foam core. The firm adhesion of the polyurethane core to the outer thermoplastic layer, when cast in place in contact with the thermoplastic layer, represents a particularly desirable feature. Similarly the procedure of applying the thermosetting resin in uncured liquid form directly onto the surface of the previously cured polyurethane foam results, as described, in unusually good adhesion. The manner in which the thermoplastic resin overlaps the polyurethane foam core at the upper edge of the boat hull, and extends downwardly on the outside surface of the thermoplastic shell at the upper-marginal edge thereof, makes for a particularly firm and rigid construction as well as a water-tight seal, all without any necessity for the use of special separately applied adhesives or similar measures.

Having thus described my invention, what I claim and desire to protect by Letters Patent is:

1. A boat hull structure comprising in combination an outer shell of high impact strength thermoplastic gum plastic material comprising an intimate mixture of from 51% to 90% by weight of a hard, resinous styrene-acrylonitrile copolymer and corresponding from 49% to 10% by weight of a soft, rubbery butadiene-acrylonitrile copolymer and an inner layer of thermosetting unsaturated polyester resin composition, the said thermoplastic shell and thermosetting layer being spaced from each other and united together by an intermediate layer of polyurethane plastic foam which is relatively thick in comparison to said thermoplastic shell and thermosetting inner layer.

2. A method of making a boat hull structure comprising in combination the steps of forming a sheet of high impact strength thermoplastic gum plastic material comprising an intimate mixture of from 51% to 90% by weight of a hard, resinous styrene-acrylonitrile copolymer and correspondingly from 49% to 10% by weight of a soft, rubbery butadiene-acrylonitrile copolymer into the form of an outer shell of the said hull, placing a male mold form within said shell in spaced relationship thereto to form a mold cavity, the said outer thermoplastic shell forming one wall of the said cavity, depositing a curable, foamable polyurethane composition in the said cavity, curing and foaming the polyurethane within the cavity whereby the cavity becomes filled with cured polyurethane plastic foam composition, removing the male mold form to expose the surface of the cured polyurethane foam, applying to the surface of the cured polyurethane foam a liquid thermosetting unsaturated polyester resin composition, and curing the said liquid to a solid, insoluble, infusible state in contact with the surface of the cured polyurethane foam.

3. A boat hull structure comprising in combination
    (a) an outer shell of high impact strength thermoplastic gum plastic material containing from 51% to 90% by weight of a hard, resinous material and correspondingly from 49% to 10% by weight of a soft, rubbery butadiene polymer, the said resinous material being selected from the group consisting of
        (1) styrene-acrylonitrile resin and
        (2) mixtures of styrene-acrylonitrile resin with vinyl chloride resin in weight ratio of from 1:1 to 10:1, and
    (b) an inner layer of thermosetting unsaturated polyester resin composition,
    the said thermoplastic shell and thermosetting layer being spaced from each other and united together by
    (c) an intermediate layer of polyurethane plastic foam which is relatively thick in comparison to said thermoplastic shell (a) and thermosetting inner layer (b).

References Cited in the file of this patent

UNITED STATES PATENTS

| 2,845,997 | Waite | Aug. 5, 1958 |
| 2,976,577 | Gould | Mar. 28, 1961 |

FOREIGN PATENTS

| 1,220,409 | France | Jan. 4, 1960 |